(12) United States Patent
Kim et al.

(10) Patent No.: US 7,336,710 B2
(45) Date of Patent: Feb. 26, 2008

(54) METHOD OF MOTION ESTIMATION IN MOBILE DEVICE

(75) Inventors: Seon Tae Kim, Taejon (KR); Bumho Kim, Seoul (KR); Pyeong Soo Mah, Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 813 days.

(21) Appl. No.: 10/743,714

(22) Filed: Dec. 24, 2003

(65) Prior Publication Data
US 2005/0105616 A1 May 19, 2005

(30) Foreign Application Priority Data
Nov. 13, 2003 (KR) ............... 10-2003-0080117

(51) Int. Cl.
*H04N 7/36* (2006.01)
(52) U.S. Cl. .................. 375/240.16; 348/699; 382/236
(58) Field of Classification Search ........... 375/240.16; 382/236; 348/699
See application file for complete search history.

(56) References Cited

U.S. PATENT DOCUMENTS

| | | | | |
|---|---|---|---|---|
| 5,329,318 A * | 7/1994 | Keith | .......... | 348/699 |
| 5,357,287 A * | 10/1994 | Koo et al. | .......... | 348/699 |
| 5,696,698 A * | 12/1997 | Herluison et al. | .......... | 345/557 |
| 5,706,059 A * | 1/1998 | Ran et al. | .......... | 348/699 |
| 6,108,040 A * | 8/2000 | Moteki et al. | .......... | 375/240.16 |
| 6,141,448 A * | 10/2000 | Khansari et al. | .......... | 382/236 |
| 6,148,034 A * | 11/2000 | Lipovski | .......... | 375/240.16 |
| 6,282,243 B1 * | 8/2001 | Kazui et al. | .......... | 375/240.16 |
| 6,380,986 B1 * | 4/2002 | Minami et al. | .......... | 348/699 |
| 6,473,460 B1 * | 10/2002 | Topper | .......... | 375/240.16 |
| 6,813,315 B1 * | 11/2004 | Auyeung et al. | .......... | 375/240.16 |
| 2002/0031179 A1 * | 3/2002 | Rovati et al. | .......... | 375/240.16 |
| 2004/0013197 A1 * | 1/2004 | Park | .......... | 375/240.11 |
| 2004/0141554 A1 * | 7/2004 | Phong et al. | .......... | 375/240.12 |

FOREIGN PATENT DOCUMENTS

| | | |
|---|---|---|
| KR | 2000-55899 | 9/2000 |
| KR | 2002-08976 | 2/2002 |

OTHER PUBLICATIONS

Huang, Y. W. et al. "Predictive Line Search: An Efficient Motion Estmation Algorithm for MPEG-4 Encoding Systems on Multimedia Processors", IEEE Transactions on Circuits and Systems for Video Technology, Jan. 2003, vo. 13, No. 1, pp. 111-117.*

Yu-Wen Huang, et al.; "*Predictive Line Search: An Efficient Motion Estimation Algorithm for MPEG-4 Encoding Systems on Multimedia Processors*"; IEEE Transactions on Circuits and Systems for Video Technology; vol. 13; No. 1; Jan. 2003; pp. 111-117.

* cited by examiner

*Primary Examiner*—Mehrdad Dastouri
*Assistant Examiner*—David N Werner
(74) *Attorney, Agent, or Firm*—Lowe Hauptman Ham & Berner LLP

(57) ABSTRACT

A method of estimating motion in a mobile device reduces access of external memory and power consumption while increasing the usability of internal memory. The method includes recognizing an overlapped block of a reference search area between the current and its next macro block, and transferring only non-overlapped blocks to internal memory when motion estimation of a next macro block is performed.

5 Claims, 7 Drawing Sheets

FIG. 4A (PRIOR ART)
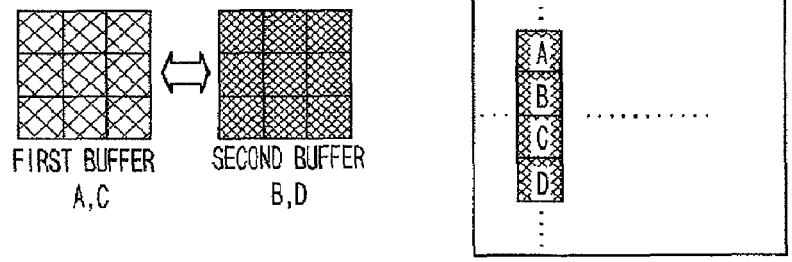
FIG. 4B
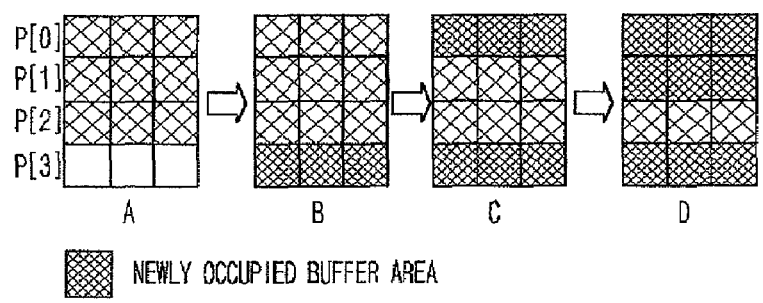
FIG. 5A
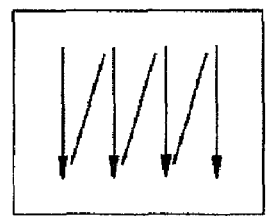
FIG. 5B
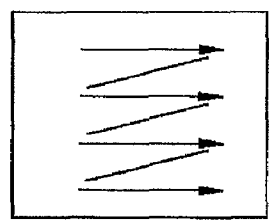
FIG. 5C
FIG. 5D
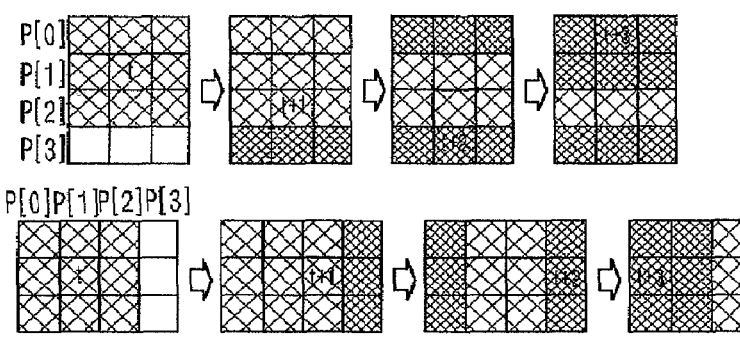

METHOD OF MOTION ESTIMATION IN MOBILE DEVICE

BACKGROUND OF THE INVENTION

1. Field of the Invention

The present invention relates to a motion estimation method used in a video compression algorithm of a mobile device, and more particularly, to a method for effectively implementing a motion estimation algorithm which occupies a large amount of a video compression in implementing an MPEG-4 video encoder on an embedded system such as a mobile device having a small memory.

2. Description of the Related Art

A low bit rate video compression algorithm used in an embedded system is a standard MPEG-4. The basic structure of the encoder, as shown in FIG. 1, includes a rectangular texture encoding unit 1 used for general video compression, and a shape encoding unit 2 for compressing a shape. The encoder can be used for various applications. The texture encoding unit 1 compresses unnecessary data on space information and time information. Today, the texture encoding unit 1 have been developed and widely used as various standard common algorithms.

This algorithm compresses information on space and time. It requires a discrete cosine transformation (DCT)/inverse discrete cosine transformation (IDCT) process and a quantization process to compress space information. To compress information on time, it is needed a motion estimation process, a motion compensation process and a buffering process for storing a previous screen. A variable length encoder compresses the quantized data of space information and time information according to information probability.

A motion detector 10 needs a lot of memory accesses and a large memory size in implementing a MPEG-4 algorithm and greatly influences the performance of the MPEG-4 video encoder algorithm. There is a kind of pictures that is P-frame or B-frame, according to the frame direction of motion estimation. However, their motion estimations are similar to each other in that they estimate motion vector by using memory access of a current macro-block and a reference search area of a previous or next frame. So, only the motion estimation unit for P-frames will be described in this specification. The motion detector 10 for P-frames estimates motion vectors by using previous frame (t−1) and the current frame (t) as shown in FIG. 2A. In other words, the motion detector 10 finds the most similar location by moving a macro-block of the current frame on a reference search area of a previous frame by pixel. A mean square error (MSE) method, a sum of absolute difference (SAD) method and a mean absolute difference (MAD) method are proposed as the methods to find similarity of a current macro-block and a reference search area.

FIGS. 2A and 2B illustrate a conventional implementation of a motion estimation method according to an MPEG-4 video encoding algorithm. In the conventional motion estimation method shown in FIG. 2A, a reference frame and a current frame are stored in an external memory to find similarity. The higher frame resolution the video has, the more memory the method requires. Accordingly, when an internal memory has a small capacity, an external memory should be used since the internal memory cannot store all the data. When an external memory is used, the system implementing the method becomes slower, since the external memory is slower to be accessed compared with internal memory within a microprocessor. Furthermore, since frequent access to the external memory consumes a large amount of electric power, the method could not be applied to a mobile terminal which attaches importance to power consumption to use a battery for a long time.

In the conventional motion estimation method shown in FIG. 2B, a method of double buffering is used to overcome the disadvantage of the method described in FIG. 2A. To effectively use the double buffering method, direct memory access (DMA) should be used, in which data are transferred between memories without any intervention of a main-processor. In other words, when one macro block is executed, a reference search area stored in a first buffer shown in FIG. 2B is used, and simultaneously a next reference search area is stored in a second buffer shown in FIG. 2B by using the DMA without any intervention of the main-processor. If motion estimation is performed on an intended macro block, the next reference search area that was moved using DMA beforehand is used to find a motion vector so as to perform motion estimation on the next macro block.

In an embedded system such as a mobile terminal, the frequency of the processor is much lower than that of a general processor due to power management of a mobile battery. And the internal memory has a small capacity because of commercial business. Accordingly, to implement a very complex MPEG-4 video encoder compression algorithm in the mobile terminal, it is necessary to effectively configure a motion estimation part that consume a lot of electric power as well as compression time.

In the related art, when the motion vector is estimated, all the entire image is stored in an external memory of the mobile terminal without relation to the type or the size of memory, and MSE values or SAD values between two macro-blocks are compared with each other to determine a motion vector to be the location that has a minimum value of MSE or SAD. However, the mobile terminal having a small internal memory is required to more effectively use its memory. In other words, if an image is stored in an external memory so as to be used, the performance of the processor is lowered and consumption power is increased. So, the method is required in which the frequency of accesses to the external memory should be minimized and in which the external memory should be accessed block by block so as to consecutively access to the external memory when accessing to the external memory, so that the internal memory can be used more effectively.

SUMMARY OF THE INVENTION

Accordingly, the present invention is directed to a method of detecting motion in a mobile device that substantially obviates one or more problems due to limitations and disadvantages of the related art.

It is an object of the present invention to provide a method of detecting motion in a mobile device to use more effectively memories so as to operate an MPEG-4 video encoder.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of detecting motion in a mobile device according to the present invention comprises the steps of: (a) obtaining the horizontal and vertical numbers of macro blocks of a frame and initializing horizontal and vertical sizes of the macro block; (b) moving a predetermined number of data in a column of the frame to a predetermined number of block buffers of an internal memory; (c) performing motion estimation on the data stored in the block buffers and counting up the vertical number of the macro blocks; (d) ascertaining whether the motion estimation is completed on the block buffers in a vertical direction, and if the motion detection is completed on the blocks in the vertical direction, initializing the vertical size of the macro block and counting up the location of the block buffers in a horizontal direction; and (e) ascertaining whether the motion detection is completed on the block buffers in a horizontal direction, and if the motion detection is not completed on the blocks in the horizontal direction, it goes to the step (b).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A and 4B illustrate an example of memory data transfer to which a motion estimation method according to an embodiment of the present invention is applied, and a memory usage example to which a conventional method is applied;

FIGS. 5A through 5D illustrate buffer allocation and data transfer of the cases that motion of a macro block of a current frame proceeds vertically in the motion estimation method according to the embodiment of the present invention, and the buffer allocation and the data transfer of the cases that motion of the macro block of the frame proceeds horizontally in the motion detection method according to the embodiment of the present invention

FIGS. 7A and 7B illustrate a data array of a buffer used when detecting horizontal and vertical motions respectively in the motion detection method according to the embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
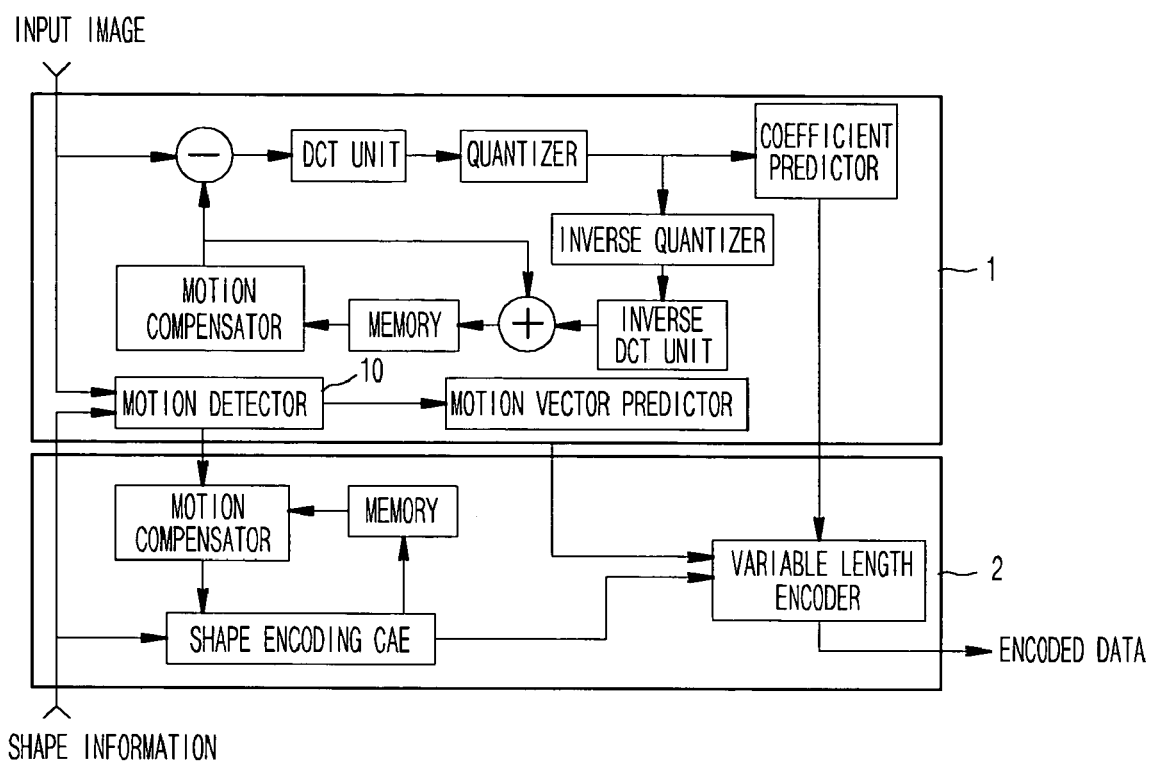
FIG. 1 is illustrates a schematic diagram of a general MPEG-4 video encoder.
Figure 2A:
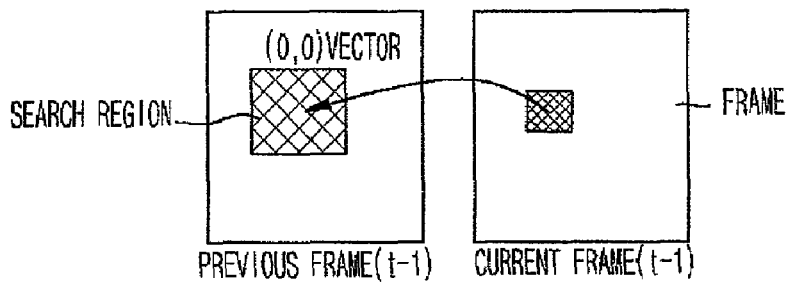
FIGS. 2A and 2B illustrate the conventional implementation of a motion estimation method according to an MPEG-4 video encoding algorithm.
Figure 2B:
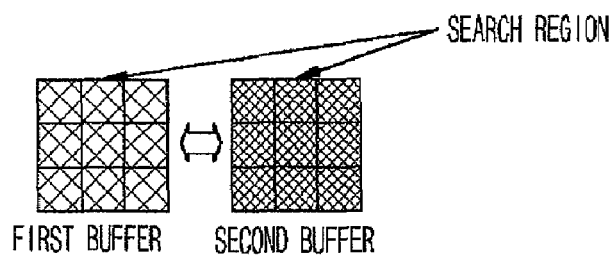
Figure 3:
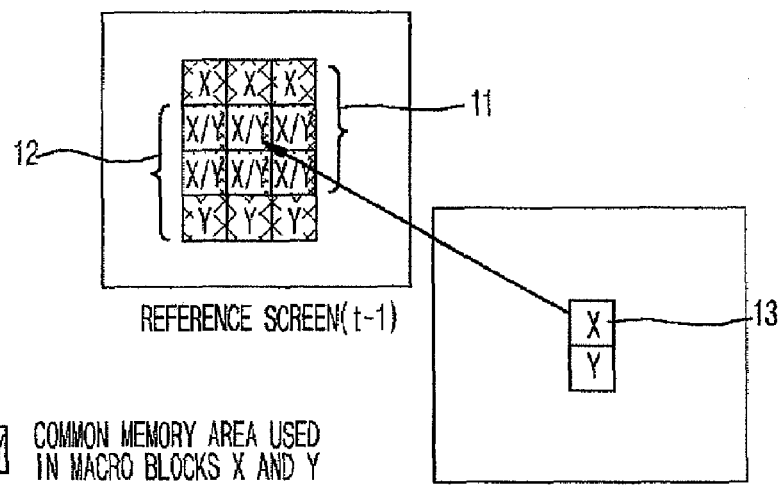
FIG. 3 illustrates an example of memory usage in a mobile terminal, to which a motion estimation method according to an embodiment of the present invention is applied.

FIG. 3 illustrates a memory usage example in a mobile terminal, to which the implementation of a motion estimation method according to an embodiment of the present invention is applied. FIG. 3 shows a reference search area 11 and 12 according to each macro block for a consecutive macro block 13 X and Y for motion estimation. As shown in FIG. 3, overlapped memory blocks can be generated in the reference search area for the consecutive macro block of the current frame. Here, in the related art, the overlapped memory block X/Y in the reference search area is discarded and data is updated for the data discarded when detecting motion of the next macro block. However, in the present invention, the overlapped memory block is reused and only the necessary memory block is transferred in a buffer to reduce the frequency of memory access.

As shown in FIG. 3, in the motion estimation method of the mobile terminal according to the present invention, it is possible to increase the number of buffers instead of reducing the size of the buffer, and reduce the size of the internal memory used in the conventional double buffering method, so as to more effectively use a small internal memory. In other words, in the conventional double buffering method shown in FIG. 4A, nine macro blocks are used and discarded when detecting motion of one macro block for the reference search area of the internal memory. However, as shown FIG. 4B, in the method suggested by the present invention, one buffer P[3] consisting of three macro blocks is further provided to use a circular buffering configuration. Only three macro blocks are moved in memories to transfer data between memories so that it is possible to detect motion.

When detecting motion of macro blocks for A, B, C and D, the size of moved data is as shown in FIG. 4B. In the conventional method, when the doubling buffering method is used, since the first buffer and the second buffer are used twice respectively, data of thirty-six macro blocks (=nine macro blocks×4) are moved. However, in the circular buffer suggested by the present invention, since data of eighteen macro blocks are moved, motion can be detected though the amount of moved data is reduced to the half compared with the conventional method. As the number of the macro blocks is increased, the data movement ratio of the method of the present invention to that of the conventional art is further decreased and converges to ⅓. In other words, supposing that the number of the macro blocks is N simply, the amount of moved data of the double buffer is N×9 and the amount of moved data of the circular buffer is (N+2)×3.

Considering the motion estimation method shown in FIG. 3 in the aspect of the frame, there are two methods. In the first method, the motion of the macro block of the frame proceeds first vertically, and then is initialized and proceeds horizontally as shown in FIG. 5A. In the second method, the motion of the macro block of the frame proceeds first horizontally and is initialized and proceeds vertically as shown in FIG. 5B. FIG. 5C illustrates buffer allocation and data transfer of the cases that motion is detected vertically. FIG. 5D illustrates buffer allocation and data transfer of the cases that motion is detected horizontally. The value "t" indicates the location of the macro block desired to detect motion.

Next, referring to the flowchart shown in FIG. 6, the motion estimation method of a mobile terminal according to an embodiment of the present invention will be described.

Figure 6:
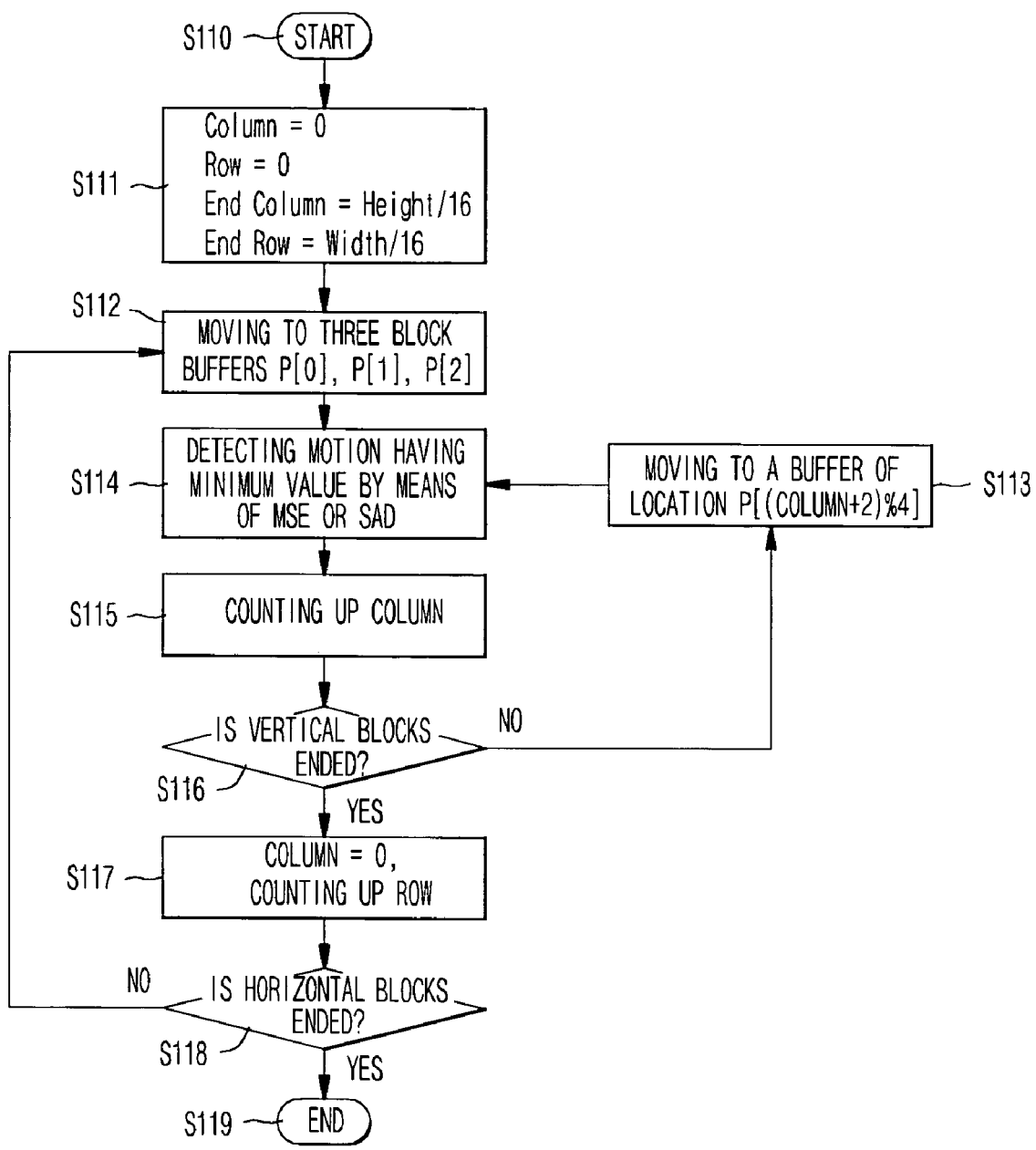
FIG. 6 is a flowchart illustrating a motion detection method according to an embodiment of the present invention when motion of a macro block of a frame proceeds vertically.

First, as shown in FIG. 5A, the vertical motion estimation is performed according to the flowchart of FIG. 6. In other words, if a motion detection algorithm begins for a frame (S111), the numbers of macro blocks of a frame are obtained horizontally and vertically from the numbers of pixels of width and height of the frame, and the horizontal and vertical initial values of macro blocks are set to be "0" (S111). At a first start point or vertical start point, data in the three buffers P[0], P[1] and P[2] bounded in three macro blocks are brought from the external memory and stored in the internal memory (S112). The three above-mentioned buffers are the reference search area of the first macro block of the current frame, and the motion of the macro block is detected within the reference search area (S114). When the motion estimation is completed on one macro block, the vertical number of the macro blocks is counted up by one to detect motion of the next macro block vertically (S115). Then, it is ascertained whether the macro block is the last macro block in a vertical direction of the current frame (S116). At the step (S116), if the macro block is not the last macro block in a vertical direction of the current frame, three macro block data for the reference search area are transferred to the buffers located at P[{(the vertical number of macro blocks)+2}% 4] to detect the motion of the macro block in the next column, wherein the symbol "%" refers to a modulo division operation, as known to those knowledgeable in the field of software engineering. If it is determined that the motion detection is completed on blocks in a column at the step (S116), the value of column is initialized and the value of row is counted up by one (S117). Now, it is determined whether the motion detection is completed in a horizontal direction by determining whether the block in a row is terminated (S118). If the motion detection is not completed in the horizontal direction at the step S118, it goes to the step (S118) to continuously perform the motion estimation algorithm. If the motion detection is completed in the horizontal direction at the step (S118), the motion estimation algorithm is terminated (S119).

In the case motion is detected on blocks horizontally as shown in FIG. 5B, the detailed description will be omitted since the implementation is the same as the described if the "horizontal direction" is changed with the "vertical direction".

Figures 7A, 7B:
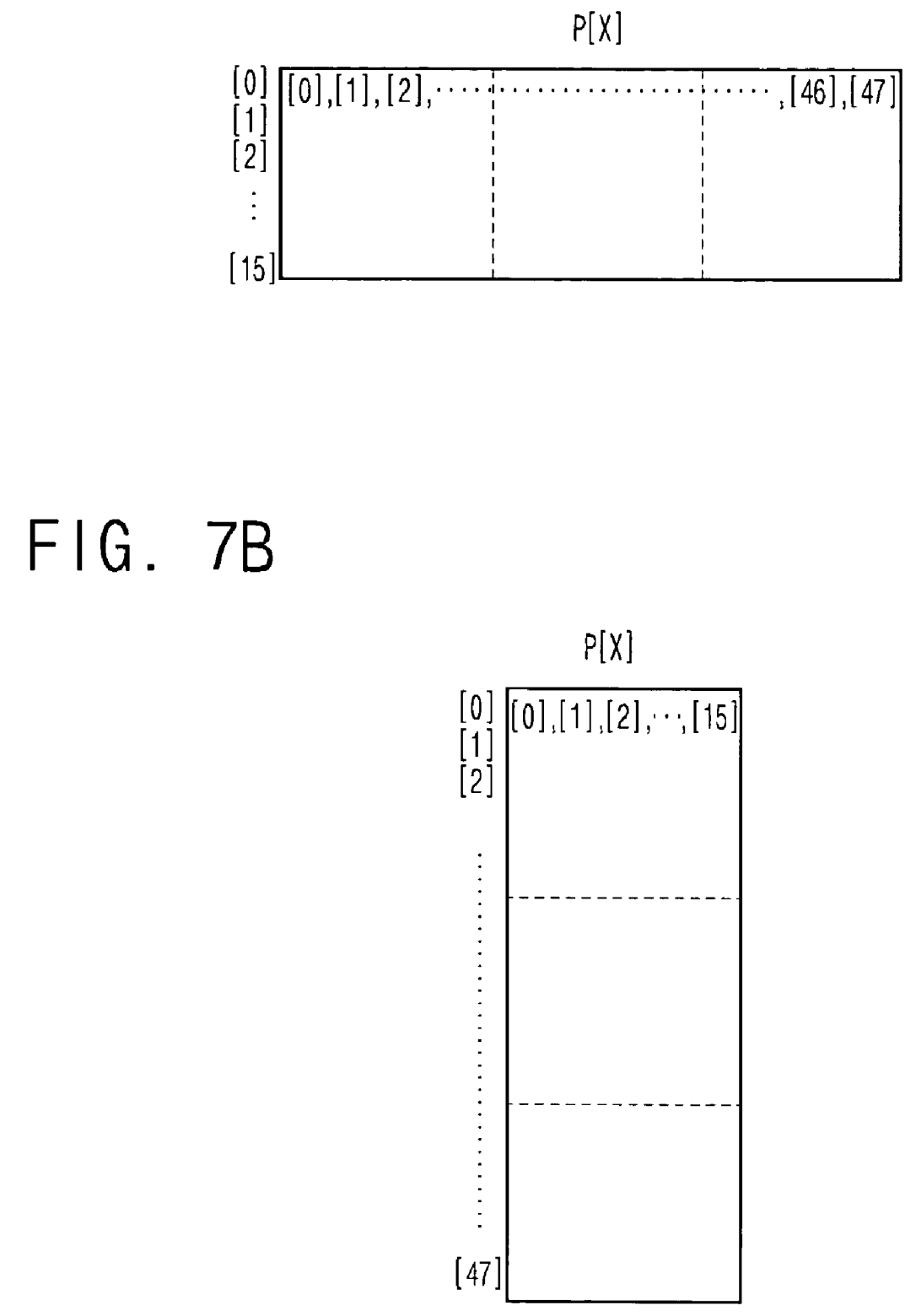

The data to be stored in the buffer is stored in 3-dimensional format. The method to obtain a SAD value is different according to the array format. In the case of vertical direction, as shown in FIG. 7a, three macro blocks make a 48×16 array to form a buffer. Whenever motion estimation is performed, one motion vector can be obtained with data movement of a buffer. In the case of horizontal direction, three macro blocks make a 16×48 array to form a buffer. Four buffers are arranged in a circular loop. One motion estimation allows data corresponding to one buffer size to be transferred.

Figure 8A:
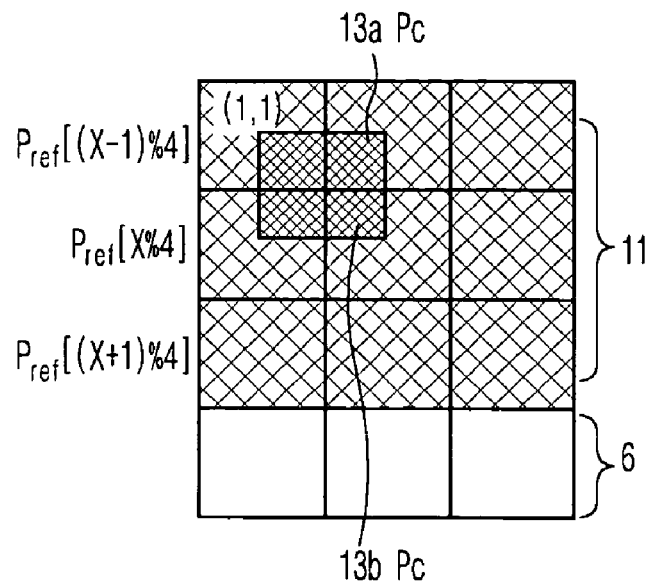
FIGS. 8A and 8B illustrate a process of obtaining a motion SAD value of a macro block.
Figure 8B:
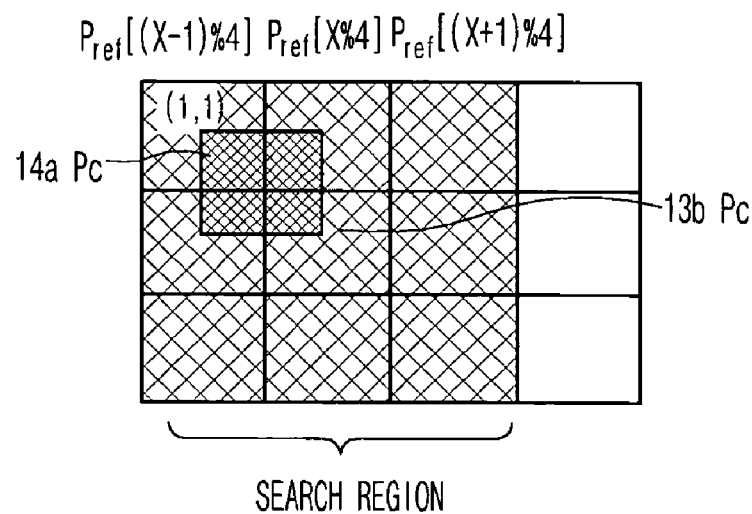

FIGS. 8A and 8B illustrate a reference search area 11 (P$_{ref}$[x−1], P$_{ref}$[x], P$_{ref}$[x+1]) for a macro block P$_c$ desired when the search range is set to be [−16, 15]. To obtain the similarity SAD between two macro blocks, it should be considered that the macro block may partially occupy the two buffers at the same time. In other words, as shown in FIG. 8A, the similarity SAD for motion coordinates (i, j) is obtained as the sum of SAD$_1$ of the block 13a and SAD$_2$ of the block 13b. The values of SAD$_1$ and SAD$_2$ are represented in equation 1.

Equation 1

For −16≦j<0, if the desired macro block exists between P$_{ref}$[(x−1)%4] and P$_{ref}$[x%4], $$\begin{cases} SAD_1 = \sum_{k=0}^{15-j} \sum_{l=0}^{15} |P_c[k][l] - P_{ref}[(x-1)\%4][k+j][l]| & 13a \\ \wedge\wedge\wedge\wedge\wedge\wedge\wedge\wedge & \\ SAD_2 = \sum_{K=15-j}^{15} \sum_{L=0}^{15} |P_c[k][l] - P_{ref}[x\%4][k-(15-j)][l]| & 13b \\ \wedge\wedge\wedge\wedge\wedge\wedge\wedge & \end{cases}$$

For 0≦j<15, if the desired macro block exists between P$_{ref}$[x%4] and P$_{ref}$[(x+1)%4], $$\begin{cases} SAD_1 = \sum_{k=0}^{15-j} \sum_{l=0}^{15} |P_c[k][l] - P_{ref}[x\%4][k+j][l]| & 13a \\ \wedge\wedge\wedge\wedge\wedge\wedge\wedge\wedge\wedge\wedge & \\ SAD_2 = \sum_{k=15-j}^{15} \sum_{l=0}^{15} |P_c[k][l] - P_{ref}[(x+1)\%4][k-(15-j)][l]| & 13b \\ \wedge\wedge\wedge\wedge\wedge\wedge & \end{cases}$$

In equation 1, since i belongs to a buffer, equation 1 is not changed according to the increase of i. However, j may belong to another buffer, two ranges should be defined as equation 1. When the value of the motion vector is obtained by motion detection on the macro block P$_c$, data of a buffer is moved to the buffer of P[(x+2) % 4] so as to detect motion of the next macro block to integrate with the previous duplicate buffer to form a reference search region 6.

In the horizontal motion estimation of FIG. 8b, the method to obtain a SAD value for the search range is similar to that shown in FIG. 8A. The real example of obtaining a SAD value is as following equation 2. In the horizontal direction, since j belongs to a buffer, equation 2 is not changed due to the change of j and the ranges to obtain SAD values are defined according to i.

Equation 2

For −16≦j<0, if the desired macro block exists between P$_{ref}$[(x+1)%4] and P$_{ref}$[x%4], $$\begin{cases} SAD_1 = \sum_{k=0}^{15} \sum_{l=0}^{15-i} |P_c[k][l] - P_{ref}[(x-1)\%4][k][l+i]| & 13a \\ \wedge\wedge\wedge\wedge\wedge\wedge\wedge\wedge & \\ SAD_2 = \sum_{k=0}^{15} \sum_{l=15-i}^{15} |P_c[k][l] - P_{ref}[x\%4][k][l-(15-i)]| & 13b \\ \wedge\wedge\wedge\wedge\wedge\wedge\wedge\wedge & \end{cases}$$

For 16≦j<32, if the desired macro block exists between P$_{ref}$[x%4] and P$_{ref}$[(x+1)%4], $$\begin{cases} SAD_1 = \sum_{k=0}^{15} \sum_{l=0}^{15-i} |P_c[k][l] - P_{ref}[(x\%4][k][l+i]| & 13a \\ \wedge\wedge\wedge\wedge\wedge\wedge\wedge\wedge\wedge\wedge & \\ SAD_2 = \sum_{k=0}^{15} \sum_{l=15-i}^{15} |P_c[k][l] - P_{ref}[(x+1)\%4][k][l-(15-i)]| & 13b \\ \wedge\wedge\wedge\wedge\wedge & \end{cases}$$

In the above example, the description was made for the search range [−16, 15]. However, if the moving pictures change very slightly, the search range [−8, 7] is sufficient. Such a search range is usually used. The reference images in the vertical direction and the horizontal direction and the movement of the buffer data are shown in FIG. 9.

Figure 9A:
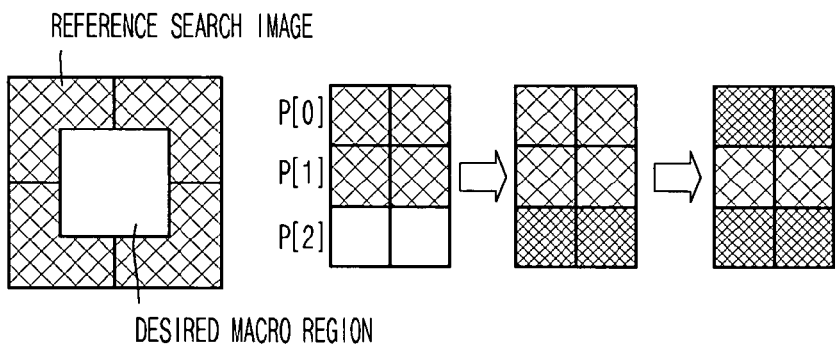
FIG. 9 illustrates a relationship between a macro block and buffer allocation for a reference search region when the motion detection method according to an embodiment of the present invention is executed at the reference search range [−8, 7]
Figure 9B:
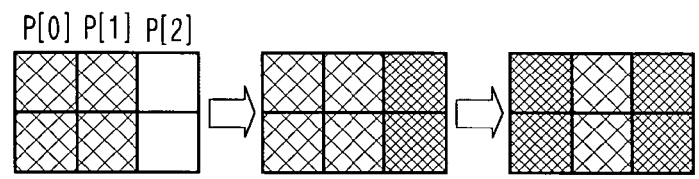

As shown in FIG. 9, since the reference search range is small, the allocated size of the buffer and the size of the circular buffer are also small.

Figure 10A:
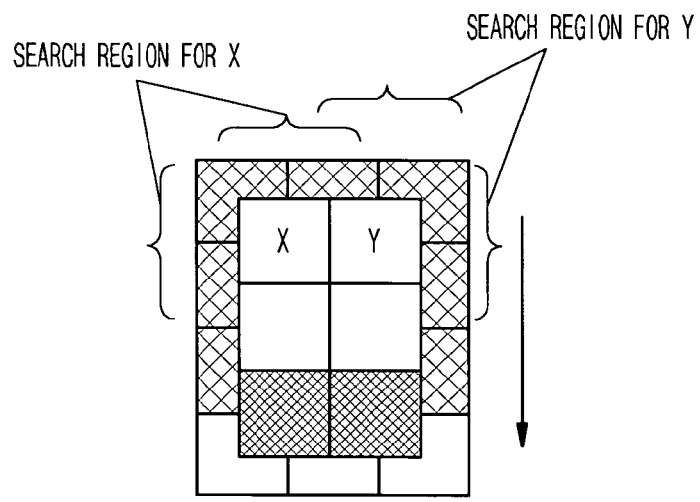
FIGS. 10A and 10B illustrate relation between a search range in detecting motion and a motion detection macro block to be found when a circular buffer used in a reference search region [−16, 15] is used in a reference search region [−8, 7].
Figure 10B:
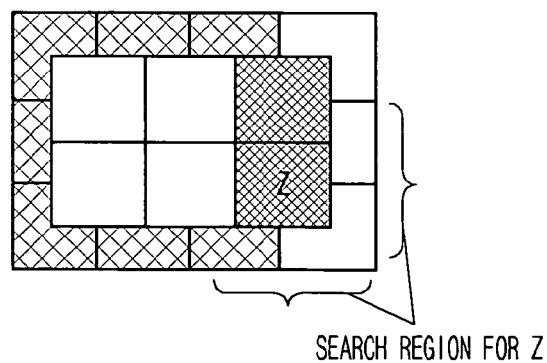

The buffer allocation of the internal memory is subject to the change of the search range. To maintain the buffer allocation to be constant despite the change of the search range, the motion estimation should be performed as shown in FIG. 10. In other words, when the data in a buffer is moved, not one motion detection but two motion detections X and Y are performed. The motion detections in the vertical direction and the horizontal direction are the same as described above.

As described above, if the motion detection method according to the present invention, the mobile terminal that has a small internal memory can effectively access to its memory to enhance its speed performance. Besides, in the motion estimation method, the frequency of accessing to the external memory is reduced and a built-in memory in a chip is used so that the available time of a mobile battery can be longer. The external memory consumes a lot of electric power and the built-in memory consumes small power. So, more advanced portability and convenience are provided to a mobile terminal.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of detecting motion in a mobile device, the method comprising the steps of:
    (a) obtaining horizontal and vertical number of macro blocks of a frame and initializing horizontal and vertical sizes of the macro block;
    (b) moving a predetermined amount of data in a column of the frame to a predetermined number of block buffers of an internal memory;
    (c) performing motion detection on the data stored in the block buffers and incrementing the vertical number of the macro blocks;
    (d) ascertaining whether the motion detection is completed on the block buffers in a vertical direction, and if the motion detection is completed on the blocks in the vertical direction, initializing the vertical size of the macro block and incrementing the location of the block buffers in a horizontal direction, moving a predetermined amount of macro block data to a block location making the block buffers form a circular buffer if the motion detection is not completed in the vertical direction, and performing a modulo division operation to form the circular buffer; determining buffer addresses with remaining values; determining similarity according to each block location on the circular buffer to obtain a sum of absolute difference (SAD) value; and
    (e) ascertaining whether the motion detection is completed on the block buffers in a horizontal direction, and if the motion detection is not completed on the blocks in the horizontal direction, and if the motion detection is not competed on the blocks in the horizontal direction, the method continues to step (b);
    wherein a search range is (−16, 15), inclusive,
    and the data is arranged in a 48×16 array in a vertical direction and the data is arranged in a 16×48 array in the horizontal direction so as to pack the data in blocks when moving the data.

2. The method of claim 1, wherein in the step (d), if the motion detection is not completed in the vertical direction, a predetermined amount of macro block data is moved to a block location obtained by a modulo division operation.

3. The method of claim 2, wherein the modulo division operation used to determine the block location is equal to: ({(the vertical number of macro blocks)+2}mod 4), if there are three macroblocks.

4. The method of claim 1, wherein a search range is (−8, 7), inclusive, the data is arranged in a 32×16 array in the vertical direction and the data is arranged in a 16×32 array-in the horizontal direction so as to pack the data in blocks when moving the data, the method further comprising; determining a similarity according to (i, j) on the circular buffer to obtain a sum of absolute differences (SAD) value.

5. The method of claim 1, wherein the motion estimation is performed when a search range is (−8, 7), inclusive, so as to determine a size and an allocation of the circular buffer for a search range (−16, 15), inclusive.

* * * * *